(12) United States Patent
Puterbaugh et al.

(10) Patent No.: US 7,346,500 B2
(45) Date of Patent: Mar. 18, 2008

(54) METHOD OF TRANSLATING A VOICE SIGNAL TO A SERIES OF DISCRETE TONES

(75) Inventors: John D. Puterbaugh, Sterling, MA (US); Eric J. Puterbaugh, Boston, MA (US); Peter Velikonja, Brooklyn, NY (US); Robert A. Baxter, Bedford, MA (US)

(73) Assignee: Nellymoser, Inc., Arlington, MA (US)

( * ) Notice: Subject to any disclaimer, the term of this patent is extended or adjusted under 35 U.S.C. 154(b) by 168 days.

(21) Appl. No.: 11/292,452

(22) Filed: Dec. 2, 2005

(65) Prior Publication Data
US 2006/0155535 A1   Jul. 13, 2006

Related U.S. Application Data

(62) Division of application No. 10/037,097, filed on Dec. 31, 2001, now Pat. No. 7,027,983.

(51) Int. Cl.
*G10L 11/04* (2006.01)
*G10L 11/06* (2006.01)
*G10H 7/00* (2006.01)

(52) U.S. Cl. .................. 704/205; 84/649; 84/654; 704/206

(58) Field of Classification Search .......... 704/205, 704/206, 207, 208, 214; 84/609, 616, 649, 84/654
See application file for complete search history.

(56) References Cited

U.S. PATENT DOCUMENTS

| | | | |
|---|---|---|---|
| 4,384,175 A | 5/1983 | Brown | |
| 5,038,658 A | 8/1991 | Tsuruta et al. | 84/461 |
| 5,165,008 A * | 11/1992 | Hermansky et al. | 704/262 |
| 5,365,592 A | 11/1994 | Horner et al. | |
| 5,942,709 A * | 8/1999 | Szalay | 84/616 |
| 5,986,199 A | 11/1999 | Peevers | 84/603 |
| 6,075,998 A * | 6/2000 | Morishima | 455/567 |
| 6,185,527 B1 | 2/2001 | Petkovic et al. | |
| 6,216,103 B1 | 4/2001 | Wu et al. | |
| 6,308,086 B1 * | 10/2001 | Yoshino | 455/567 |
| 6,369,311 B1 * | 4/2002 | Iwamoto | 84/615 |
| 6,437,227 B1 * | 8/2002 | Theimer | 84/609 |
| 6,472,591 B2 * | 10/2002 | Aoki et al. | 84/611 |
| 6,476,308 B1 * | 11/2002 | Zhang | 84/616 |
| 6,535,851 B1 * | 3/2003 | Fanty et al. | 704/249 |
| 6,541,691 B2 * | 4/2003 | Tolonen et al. | 84/616 |

(Continued)

OTHER PUBLICATIONS

Lawrence R. Rabiner and Ronald W. Schafer; "Digital Processing of Speech Signals"; 1978, Prentice-Hall, Inc.; pp. 120-141; 150-161; 372-378.

(Continued)

*Primary Examiner*—Martin Lerner
(74) *Attorney, Agent, or Firm*—Fish & Richardson P.C.

(57) ABSTRACT

A system and method for creating a ring tone for an electronic device takes as input a phrase sung in a human voice and transforms it into a control signal controlling, for example, a ringer on a cellular telephone. Time-varying features of the input signal are analyzed to segment the signal into a set of discrete notes and assigning to each note a chromatic pitch value. The set of note start and stop times and pitches are then translated into a format suitable for controlling the device.

16 Claims, 5 Drawing Sheets

U.S. PATENT DOCUMENTS

| | | | |
|---|---|---|---|
| 6,636,602 B1 * | 10/2003 | Vlacancich | 379/374.01 |
| 6,660,923 B2 * | 12/2003 | Sato | 84/607 |
| 6,691,090 B1 * | 2/2004 | Laurila et al. | 704/250 |
| 6,928,410 B1 * | 8/2005 | Marila et al. | 704/268 |
| 7,027,983 B2 * | 4/2006 | Puterbaugh et al. | 704/231 |
| 7,099,457 B2 * | 8/2006 | Weiner | 379/373.01 |
| 2006/0081119 A1 * | 4/2006 | Kuroda | 84/659 |

OTHER PUBLICATIONS

Lawrence Rabiner and Biing-Hwang Juang; "Fundamentals of Speech Recognition"; 1993, Prentice Hall PTR; pp. Chapter 3, pp. 112-117; Chapter 4 pgs. 143-149.

Thomas F. Quatieri; "Discrete-Time Speech Signal Processing-Principles and Practice"; 2002, Prentice Hall PTR; pp. Chapter 10, pp. 504-519.

Christopher Raphael; "Automatic Segmentation of Acoustic Musical Signals Using Hidden Markov Models"; 1999, IEEE; Transactions On Pattern Analysis and Machine Intelligence, vol. 21, No. 4, pp. 360-370.

David Temperley; "The Cognition of Basic Musical Structures"; 2001, Massachusetts Institute of Technology; pp. 173-187.

Keinosuke Fukunaga; "Introduction to Statistical Pattern Recognition—Second Addition"; School of Electrical Engineering, Purdue University; p. 510.

* cited by examiner

METHOD OF TRANSLATING A VOICE SIGNAL TO A SERIES OF DISCRETE TONES

CROSS-REFERENCE TO RELATED APPLICATIONS

This application is a division of and claims priority under 35 U.S.C. §120 to U.S. application Ser. No. 10/037,097, filed Dec. 31, 2001 now U.S. Pat. No. 7,027,983, the entire contents of this application being hereby fully incorporated by reference.

FIELD OF THE INVENTION

This invention relates generally to personal electronic devices and more particularly to generating personalized ring tones for personal electronic devices such as cellular telephones.

BACKGROUND OF THE INVENTION

It is desirable to personalize the presentation of portable electronic appliances to distinguish one appliance from other similar appliances where they may otherwise be confused or simply to conform the presentation of an appliance to its owner's personal preferences. Current mobile telephones, for example, provide options for customizing the ring tone sequence that give the user a choice of what sequence is pleasant to the user's ear, the user's style, and unique to the user's personality. The proliferation of affordable mobile handsets and services has created an enormous market opportunity for wireless entertainment and voice-based communication applications, a consumer base that is an order of magnitude larger than the personal computer user base.

Although pre-existing sequences of ring tones can be downloaded from a variety of Web sites, many users wish to create a unique ring tone sequence. The current applications for creating customized ring tone sequences are limited by the fact that people with musical expertise must create them and the users must have Internet access (in addition to the mobile handset).

The current methods for generating, sending, and receiving ring tone sequences involve four basic functions. The first function is the creation of the ring tone sequence. The second function is the formatting of the ring tone sequence for delivery. The third function is the delivery of the ring tone sequence to a particular handset. The fourth function is the playback of the ring tone sequence on the handset. Current methodologies are limited in the first step of the process by the lack of available options in the creation step. All methodologies must follow network protocols and standards for functions two and three for the successful completion of any custom ring tone system. Functions two and three could be collectively referred to as delivery but are distinctly different processes. The fourth function is dependent on the hardware capabilities specific to the handset from the manufacturer and country the handset is sold.

Current methods for the creation of ring tone sequences involve some level of musical expertise. The most common way to purchase a custom ring tone sequence is to have someone compose or duplicate a popular song, post the file to a commercial Web site service, preview the ring tone sequence, then purchase the selection. This is currently a very popular method, but is limited by the requirement of an Internet connection to preview the ring tone sequences. It also requires the musical expertise of someone else to generate the files.

Another common system for the creation of ring tone sequences is to key manually, in a sequence of codes and symbols, directly into the handset. Typically, these sequences are available on various Internet sites and user forums. Again, this is limited to users with an Internet connection and the diligence to find these sequences and input them properly.

A third method involves using tools available through commercial services and handset manufacturer Web sites that allow the user to generate a ring tone sequence by creating notes and sounds in a composition setting such as, a score of music. This involves even greater musical expertise because it is essentially composing songs note by note. It also involves the use of an Internet connection.

Another method of creating a ring tone is to translate recorded music into a sequence of tones. There are a number of problems that arise when attempting to translate recorded music into a ring tone sequence for an electronic device. The translation process generally requires segmentation and pitch determination. Segmentation is the process of determining the beginning and the end of a note. Prior art systems for segmenting notes in recordings of music rely on various techniques to determine note beginning points and end points. Techniques for segmenting notes include energy-based segmentation methods as disclosed in L. Rabiner and R. Schafer, "Digital Processing of Speech Signal," Prentice Hall: 1978, pp. 120-135 and L. Rabiner and B. H. Juang, "Fundamentals of Speech Recognition," Prentice Hall: New Jersey, 1993, pp. 143-149; voicing probability-based segmentation methods as disclosed in L. Rabiner and R. Schafer, "Digital Processing of Speech Signal," Prentice Hall: 1978, pp. 135-139, 156, 372-373, and T. F. Quatieri, "Discrete-Time Speech Signal Processing: Principles and Practice," Prentice Hall: New Jersey, 2002, pp. 516-519; and statistical methods based on stationarity measures or Hidden Markov models as disclosed in C. Raphael, "Automatic Segmentation of Acoustic Musical Signals Using Hidden Markov Models," IEEE Transactions on Pattern Analysis and Machine Intelligence, vol. 21, No. 4, 1999, pp. 360-370. Once the note beginning and endpoints have been determined, the pitch of that note over the entire duration of the note must be determined. A variety of techniques for estimating the pitch of an audio signal are available, including autocorrelation techniques, cepstral techniques, wavelet techniques, and statistical techniques as disclosed in L. Rabiner and R. Schafer, "Digital Processing of Speech Signal," Prentice Hall: 1978, pp. 135-141, 150-161, 372-378; T. F. Quatieri, "Discrete-time Speech Signal Processing," Prentice Hall, New Jersey, 2002, pp. 504-5 16, and C. Raphael, "Automatic Segmentation of Acoustic Musical Signals Using Hidden Markov Models," IEEE Transactions on Pattern Analysis and Machine Intelligence, Vol. 21, No. 4, 1999, pp. 360-370. Using any of these techniques, the pitch can be measured at several times throughout the duration of a note. This resulting sequence of pitch estimates may then be used to assign a single pitch frequency to a note, as pitch estimates vary considerably over the duration of a note. This is true of most acoustic instruments and especially the human voice, which is characterized by multiple harmonics, vibrato, aspiration, and other qualities which make the assignment of a single pitch quite difficult.

It is desirable to have a system and method for creating a unique ring tone sequence for a personal electronic device that does not require musical expertise or programming tasks.

It is an object of the present invention to provide a system and apparatus to transform an audio recording into a sequence of discrete notes and to assign to each note a duration and frequency from a set of predetermined durations and frequencies.

It is another object of the present invention to provide a system and apparatus for creating custom ring tone sequences by transforming a person's singing, or any received song that has been sung, into a ring tone sequence for delivery and use on a mobile handset.

SUMMARY OF THE INVENTION

The problems of creating an individualized identification signal for electronic devices are solved by the present invention of a system and method for generating a ring tone sequence from a monophonic audio input.

The present invention is a digital signal processing system for transforming monophonic audio input into a resulting representation suitable for creating a ring tone sequence for a mobile device. It includes a method for estimating note start times and durations and a method for assigning a chromatic pitch to each note.

A data stream module samples and digitizes an analog vocalized signal, divides the digitized samples into segments called frames, and stores the digital samples for a frame into a buffer.

A primary feature estimation module analyzes each buffered frame of digitized samples to produce a set of parameters that represent salient features of the voice production mechanism. The analysis is the same for each frame. The parameters produced by the preferred embodiment are a series of cepstral coefficients, a fundamental frequency, a voicing probability and an energy measure.

A secondary feature estimation module performs a representation of the average change of the parameters produced by the primary feature estimation module.

A tertiary feature estimation module creates ordinal vectors that encode the number of frames, both forward and backward, in which the direction of change encoded in the secondary feature estimation modules remain the same.

Using the primary, secondary and tertiary features, a two-phase segmentation module produces estimates of the starting and ending frames for each segment. Each segment corresponds to a note. The first phase of the two-phase segmentation module categorizes the frames into regions of upward energy followed by downward energy by using the tertiary feature vectors. The second phase of the two-phase segmentation module looks for significant changes in the primary and secondary features over the categorized frames of successive upward and downward energy to determine starting and ending frames for each segment.

Finally, after the segments have been determined, a pitch estimation module provides an estimate of each note's pitch based on primarily the fundamental frequency as determined by the primary feature estimation module.

A ring tone sequence generation module uses the notes start time, duration, end time and pitch to generate a representation adequate for generating a ringing tone sequence on a mobile device. In the preferred embodiment, the ring tone sequence generation module produces output written in accordance with the smart messaging specification (SMS) ringing tone syntax, a part of the Global System for Mobile Communications (GSM) standard. The output may also be in Nokia Ring Tone Transfer Language, Enhanced Messaging Service (EMS) which is a standard developed by the Third Generation Partnership Project (3GPP), iMelody which is a standard for defining sounds within EMS, Multimedia Messaging Service (MMS) which is standardized by 3GPP, WAV which is a format for storing sound files supported by Microsoft Corporation and by IBM Corporation, and musical instrument digital interface (MIDI) which is the standard adopted by the electronic music industry. These outputs are suitable for being transmitted via smart messaging specification.

The present invention together with the above and other advantages may best be understood from the following detailed description of the embodiments of the invention illustrated in the drawings, wherein:

DETAILED DESCRIPTION OF THE PREFERRED EMBODIMENTS

Figure 1:
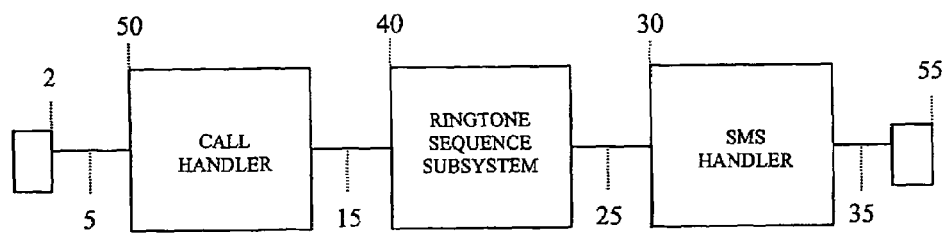
FIG. 1 is a block diagram of a telephone-based song processing and transmission system according to principles of the invention.

FIG. 1 is a block diagram of a system 10 suitable for accepting an input of a monophonicaudio signal. In a first alternative embodiment of the invention, the monophonic audio signal is a vocalized song. The system 10 provides an output of information for programming a corresponding ring tone for mobile telephones according to principles of the present invention. The system 10 has a telephony (or mobile) call handler 50, a ring tone sequence application 40 that transforms vocal input in accordance with the present invention, and a SMS handler 30. Input signal 5 from a source 2 is received at the call handler 50 for voice capture. The input signal would be of limited duration, for example, typically lasting between 5 and 60 seconds. Signals of shorter or longer duration are possible. The voice signal is then digitized and is then transmitted to the ring tone sequence subsystem 40. While the input shown here is an analog receiver such as an analog telephone, the input could also be received from an analog-to-digital signal transducer. Further, instead of receiving an input signal over a telephone network, the input signal could instead be received at a kiosk or over the Internet.

The ring tone sequence subsystem 40 analyzes the digitized voice signal 15, represents it by salient parameters, segments the signal, estimates a pitch for each segment, and produces a note-based sequence 25. The SMS handler 30 processes the note-based sequence 25 and transmits an SMS containing the ring tone representation 35 of discrete tones to a portable device 55 having the capability of "ringing" such as a cellular telephone. The ring tone representation results in an output from the "ringing" device of a series of tones recognizable to the human ear as a translation of the vocal input.

Ring Tone Sequence Subsystem

Figure 2A:
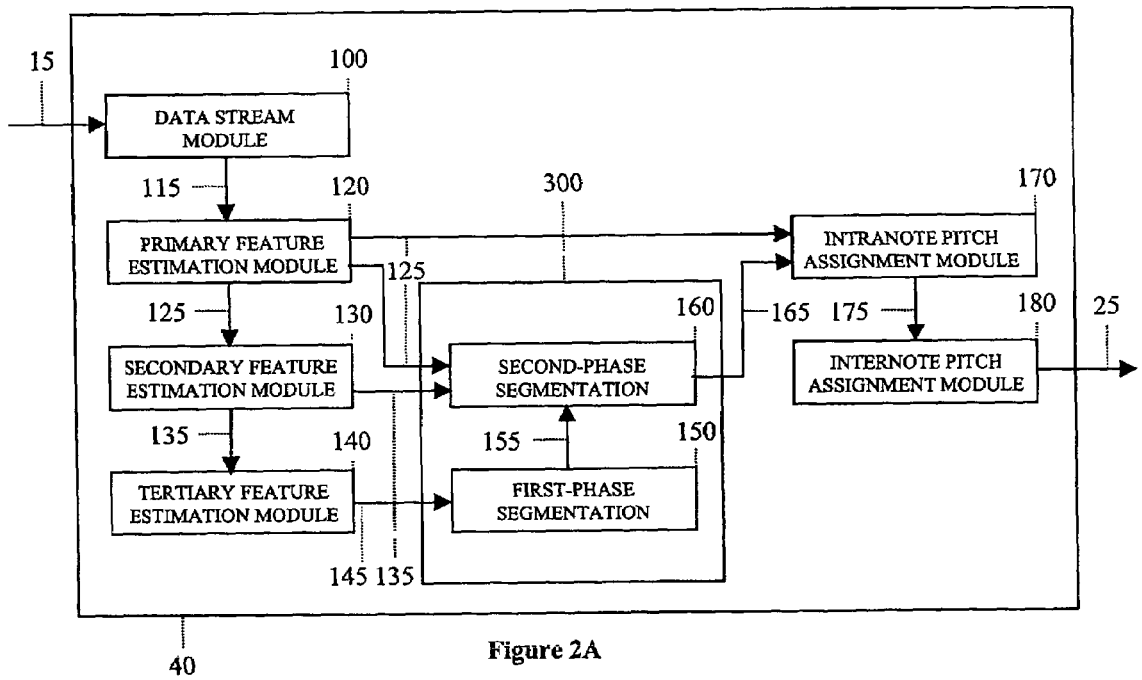
FIG. 2A is a block diagram of a ring tone sequence subsystem of FIG. 1.

FIG. 2A is a block diagram of the ring tone sequence subsystem 40 of FIG. 1. FIG. 2A illustrates in greater detail the main components of the ring tone sequence subsystem 40 and the component interconnections. The ring tone sequence subsystem 40 has a data stream module 100, a primary feature estimation module 120, a secondary feature estimation module 130, a tertiary feature estimation module 140, a segmentation module 300 comprising a first-phase segmentation module 150 and a second-phase segmentation module 160, a intranote pitch assignment subsystem 170, and a internote pitch assignment subsystem 180.

In the data stream module, 100, signal preprocessing is first applied, as known in the art, to facilitate encoding of the input signal. As is customary in the art, the digitized acoustic signal, x, is next divided into overlapping frames. The framing of the digital signal is characterized by two values: the frame rate in Hz (or the frame increment in seconds which is simply the inverse of the frame rate) and the frame width in seconds. In a preferred embodiment of the invention, the acoustic signal is sampled at 8,000 Hz and is enframed using a frame rate of 100 Hz and a frame width of 36.4 milliseconds. In a preferred embodiment, the separation of the input signal into frames is accomplished using a circular buffer having a size of 291 sample storage slots. In other embodiments the input signal buffer may be a linear buffer or other data structure. The framed signal 115 is output to the primary feature estimation module 120.

Primary Feature Estimation Module

Figure 2B:
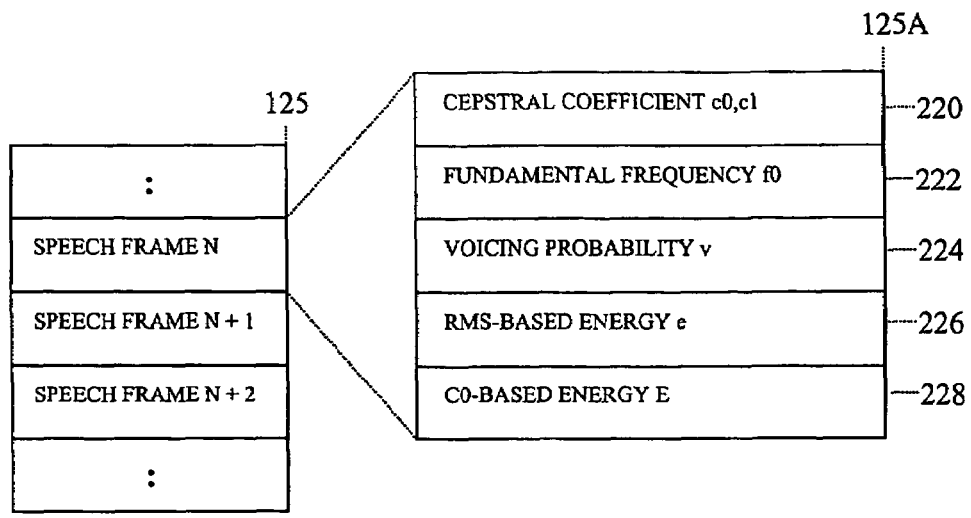
FIG. 2B is a block diagram of the primary feature parameters for a given frame whose values are generated by the primary feature estimation module of FIG. 2A.

The primary feature estimation module 120, shown in FIG. 2A, produces a set of time varying primary features 125 for each frame of the digitized input signal 15. FIG. 2B depicts a "primary data structure" 125A used to store the primary features 125 for one frame of the digitized input signal 15. The primary features generated by the primary feature estimation module 120 for each frame and stored in the primary data structure 125A are:

time-domain energy measure, E, 226
fundamental frequency, $f_0$, 222
cepstral coefficients, $\{c_0, c_1\}$, 220
cepstral-domain energy measure, e, 228,
voicing probability v, 224

The primary features are extracted as follows. The input is the digitized signal, x, which is a discrete-time signal that represents an underlying continuous waveform produced by the voice or other instrument capable of producing an acoustic signal and therefore a continuous waveform. The primary features are extracted from each frame. Let $[x]_n$ represent the value of the signal at sample n. The time at sample n relative to the beginning of the signal, n=0, is $n/f_s$, where $f_s$ is the sampling frequency in Hz. Let F(i) represent the index set of all n in frame i, and $N_F$ the number of samples in each frame.

The time-domain energy measure is extracted from frame i according to the formula $$E[i] = \frac{1}{N_F} \sum_{m \in F(i)} [w(m-i)(x[m]-\bar{x})]^2 \qquad (1)$$

where $\bar{x}$ is the mean of x[m] for all m∈F(i) and w is a window function. Equation 1 states that time-domain energy measure 226 is extracted by multiplying the signal with the mean removed by the window, summing the square of the result, and normalizing by the number of samples in the frame. The window w reaches a maximum at the center of the frame and reaches a minimum at the beginning and end of the frame. The window function is a unimodal window function. The preferred embodiment uses a Hamming window. Other types of windows that may be used include a Hanning window, a Kaiser window, a Blackman window, a Bartlett window and a rectangular window.

The fundamental frequency 222 is estimated by looking for periodicity in x. The fundamental frequency at frame i, is calculated by estimating the longest period in frame i, $T_0[i]$, and taking its inverse, $$f_0[i] = \frac{1}{T_0[i]} \qquad (2)$$

In the preferred embodiment, $f_o[i]$ is calculated using frequency domain techniques. Pitch detection techniques are well known in the art and are described, for example, in L. Rabiner and R. Schafer, "Digital Processing of Speech Signal," Prentice Hall: 1978, pp. 135-141, 150-161, 372-378; T. F. Quatieri, "Discrete-time Speech Signal Processing," Prentice Hall, New Jersey, 2002, pp. 504-516. The cepstral coefficients 220 are extracted using the complex cepstrum by computing the inverse discrete Fourier transform of the complex natural logarithm of the short-time discrete Fourier transform of the windowed signal. The short-time discrete Fourier transform is computed using techniques customary in the prior art. Let X[i,k] be the discrete Fourier transform of the windowed signal, which is computed according to the formula $$X[i,k] = \sum_{m \in F(i)} w(m-1)(x[m]-\bar{x})e^{\frac{-j2\pi mk}{N}} \qquad (3)$$

where N is the size of the discrete Fourier transform and F'(i) is F(i) with N−$N_F$ zeros added.

The cepstral coefficients are computed from the discrete Fourier transform of the natural logarithm of X[i,k] as $$c_m[i] = \sum_{k=0}^{N-1} \log X[i,k] e^{\frac{j2\pi mk}{N}} \qquad (4)$$

where $$\log X[i,k] = \log|X[i,k]| + j\text{Angle}(X[i,k]) \qquad (5)$$

and where Angle(X[i,k]) is the angle between the real and imaginary parts of X[i,k]. In the preferred embodiment, the primary features include the first three cepstral coefficients, i.e., $c_m[i]$ for m={0, 1}. Cepstral coefficients, derived from the inverse Fourier transform of the log magnitude spectrum generated from a short-time Fourier transform of one frame of the input signal, are well known in the art and is described, for example, in L. Rabiner and B. H. Juang, "Fundamentals of Speech Recognition," Prentice Hall: New Jersey, 1993, pp. 143-149, which is hereby incorporated by reference as background information.

The cepstral-domain energy measure 228 is extracted according to the formula $$e[i] = \frac{c_o[i'] - \overline{c_0}}{\max_{i'}(c_o[i'])} \quad (6)$$

The cepstral-domain energy measure represents the short-time cepstral gain with the mean value removed and normalized by the maximum gain over all frames.

The voicing probability measure 224 is defined as the point between the voiced and unvoiced portion of the frequency spectrum for one frame of the signal. A voiced signal is defined as a signal that contains only harmonically related spectral components whereas an unvoiced signal does not contain harmonically related spectral components and can be modeled as filtered noise. In the preferred embodiment, if v=1 the frame of the signal is purely voiced; if v=0, the frame of the signal is purely unvoiced.

Secondary Feature Estimation Module

Figure 2C:
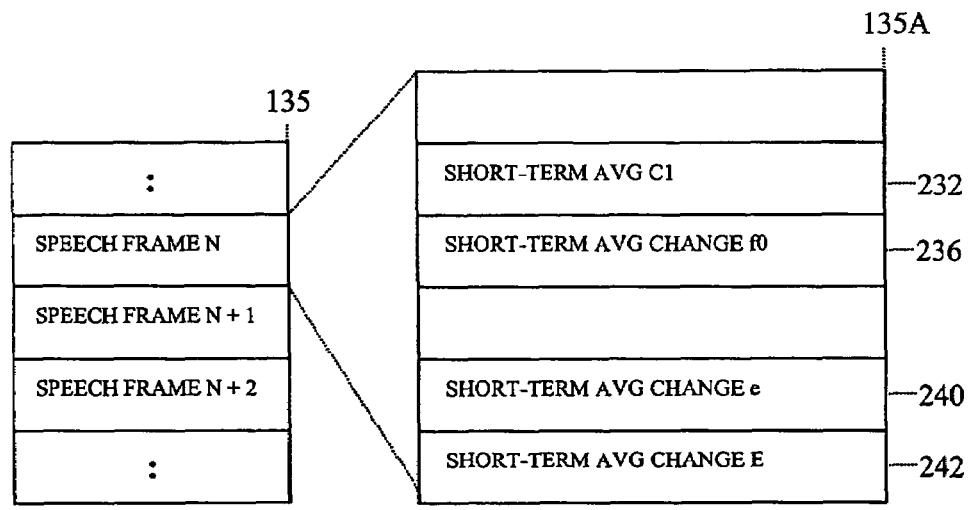
FIG. 2C is a block diagram of the secondary feature parameters for a given frame whose values are generated by the secondary feature estimation module of FIG. 2A.

The secondary feature estimation module 130, shown in FIG. 2A, produces a set of time varying secondary features 135 based on each of the features 125. FIG. 2C depicts a "secondary data structure" 135A used to store the secondary features 135 for one frame of the digitized input signal 15. The secondary feature estimation module 135 generates secondary features by taking short-term averages of the primary features 125 output from the primary feature estimation module 120. Short-term averages are typically taken over 2-10 frames. In a preferred embodiment, short-term averages are computed over three consecutive frames. Secondary features generated for each frame and stored in the secondary data structure 135A are:

short-term average change in time-domain energy E, $\overline{\Delta E}$, 242 short-term average change in fundamental frequency $f_0$, $\overline{\Delta f_0}$, 236 short-term average change in cepstral coefficient $c_1$, $\overline{\Delta_1 e}$, 232 short-term average change in cepstral-domain energy e, $\overline{\Delta e}$, 240

Tertiary Feature Estimation Module

Figure 2D:
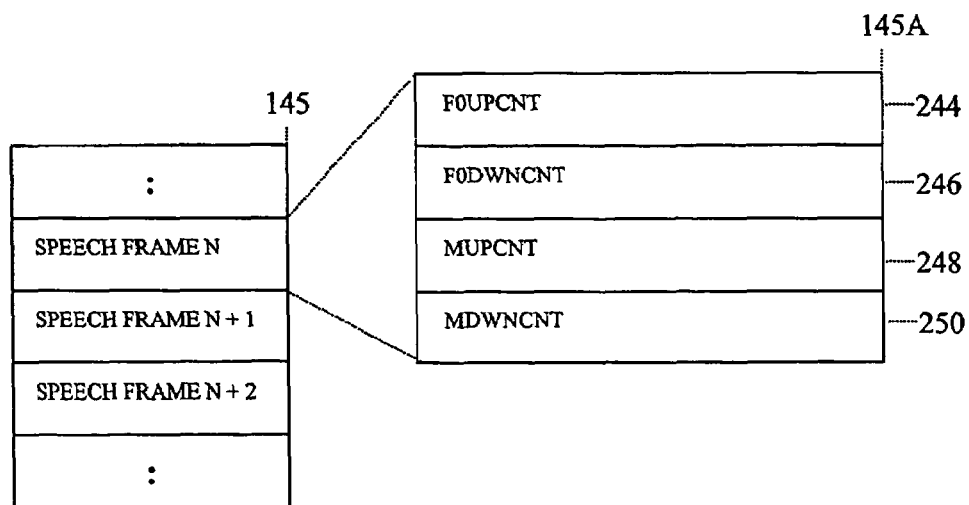
FIG. 2D is a block diagram of the tertiary feature parameters for a given frame whose values are generated by the tertiary feature estimation module of FIG. 2A.

The tertiary feature estimation module 140, shown in FIG. 2A, produces a set of time varying tertiary features 145 based on two of the five secondary features 135. FIG. 2D depicts a "tertiary data structure" 145A used initially to store the tertiary features 145 for one frame of the digitized input signal 15. The tertiary feature estimation module 145 generates tertiary features that represent the number of consecutive frames for which a given primary feature 135 changed in the same direction. Tertiary features generated for each frame and stored in the tertiary data structure 145A are:

count of consecutive upward short-term average change in cepstral-domain energy e, $N(\overline{\Delta e} > 0)$, 244 count of consecutive downward short-term average change in cepstral-domain energy e, $N(\overline{\Delta e} < 0)$, 246 count of consecutive upward short-term average change in fundamental frequency $f_0$, $N(\overline{\Delta f_0} > 0)$, 248 count of consecutive downward short-term average change in fundamental frequency $f_0$, $N(\overline{\Delta f_0} < 0)$, 250

In the preferred embodiment, counters N(a) are provided for each frame for each of the four tertiary features. The counters are reset whenever the argument a is false. The function N(a) is a function of both the frame number "a" and the particular feature being counted. For example, N(a) for short-term average change in $f_0$ is false when the value of the short-term average change at frame "a" is less than zero.

Two-phase Segmentation Module

Figure 3:
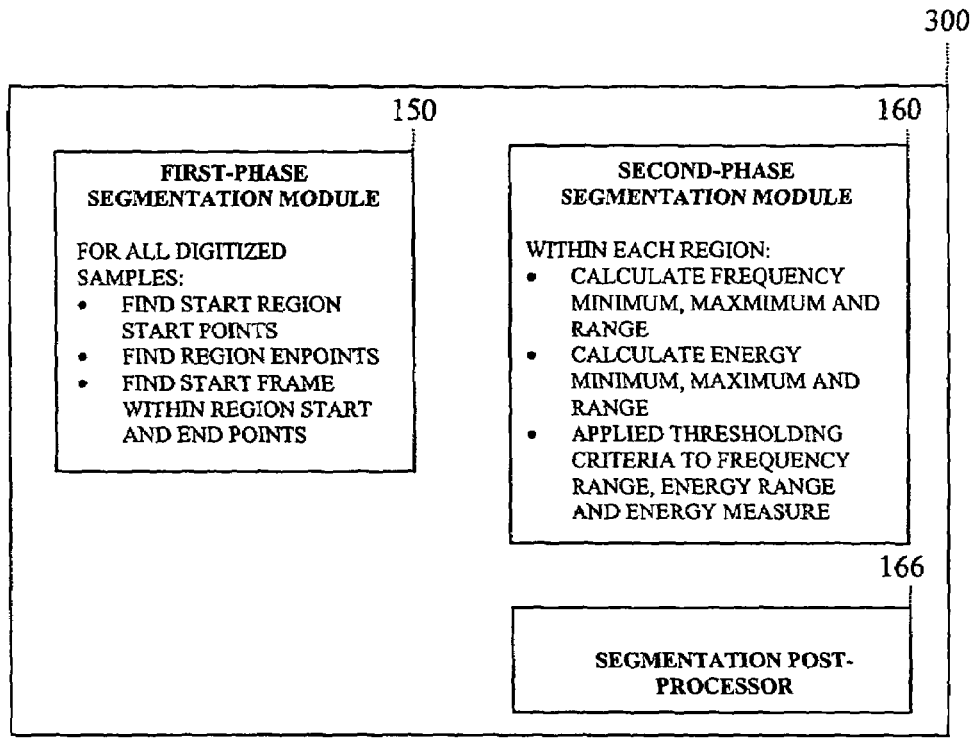
FIG. 3 is a block diagram of the two-phase segmentation modules in accordance with the present invention.

FIG. 3 is a block diagram of the two-phase segmentation module 300 including the first-phase segmentation module 150 and the second-phase segmentation module 160, shown in FIG. 2A. The first-phase segmentation module 150 groups successive frames into regions based on two of the tertiary features 145. A region is a set of frames in which the change in energy increases immediately followed by frames in which the change in energy decreases. Specifically, the tertiary features $N(\overline{\Delta e} > 0)$, 244 and $N(\overline{\Delta e} < 0)$, 246 are used to group successive frames into regions. A region, in order to be valid, must have at least a minimum number of frames, for example 10 frames. A region is defined in this way because a valid start frame, i.e. a note start, is a transitory event when energy is in flux. That is, a note does not start when the energy is flat, or when it is decreasing, or when it is continually increasing. A note start is generally characterized by an increase in energy followed by an immediate decrease in the change in energy. Typically there are 4-12 frames of increasing energy followed by 10-35 frames of decreasing energy.

For each region determined by the first-phase segmentation module 150, a candidate note start frame is estimated. Within the region, the candidate start frame is determined as the last frame within the region in which the tertiary feature $N(\overline{\Delta e} > 0)$, 244 contains a non-zero count. The second-phase segmentation module 160 determines which regions contain valid note start frames. Valid note start frames are determined by selecting all regions estimated by the first-phase segmentation module 150 that contain significant correlated change within regions. Each region starts when a given frame of $N(\overline{\Delta e} > 0)$, 244 contains a non-zero count and the previous frame of $N(\overline{\Delta e} > 0)$, 244 contains a zero.

The second-phase segmentation module 160 uses three threshold-based criteria for determining which regions and their corresponding start frames actually represent starting note boundaries. The first criteria is based on the primary feature which is the cepstral domain energy measure e. Each frame is evaluated within a valid region as determined by the first-phase segmentation process. A frame, within a valid region, is marked if it is greater than a cepstral domain energy threshold and the previous frame is less than the threshold. An example value of the cepstral domain energy threshold is 0.0001. If a valid region has any marked frames, the corresponding start frame based on $N(\overline{\Delta e} > 0)$ is chosen as a start frame representing an actual note boundary.

The second and third criteria use parameters to select whether a frame within a valid region R is marked. The parameter used by the second criteria, referred to herein as the fundamental frequency range and denoted by Range($f_0$[i],R), is calculated according to $$\mathrm{Range}(f_0[i], R) = \max_{i \in R}(f_0[i]) - \min_{i \in R}(f_0[i]).$$

An example fundamental frequency range threshold is 0.45 MIDI note numbers. Equation 7 provides a conversion from hertz to MIDI note number.

The parameter used by the third criteria, referred to herein as the energy range and denoted by Range(e[i],R), is calculated similarly. An example value of the energy threshold is a 0.2.

The candidate note start frame, within a valid region, is chosen as a start frame representing an actual note boundary if the fundamental frequency range and energy range or cepstral domain energy measure exceed these thresholds.

For each start frame, resulting from the three criteria described above, a corresponding stop frame of the note boundary is found by selecting the first frame that occurs after each start frame in which the primary feature e for that frame drops below the cepstral domain energy threshold. In the preferred embodiment, if e does not drop below the cepstral domain energy threshold on a frame prior to the next start frame, the stop frame is given to be a predefined number of frames before the next start frame. In the preferred embodiment of the invention, this stop frame is between 1 and 10 frames before the next start frame.

The output of the Two-Phase Segmentation Module is a list of note start and stop frames.

In the preferred embodiment, a segmentation post-processor 166 is used verify the list of note start and stop frames. For each note, which consists of all frames between each pair of start and stop frames, three values are calculated, which include the average voicing probability v, the average short-time energy e and the average fundamental frequency. These values are used to check whether the corresponding note should be removed from the list. For example, in the preferred embodiment, if the average voicing probability for a note is less than 0.12, the note is classified as a "breath" sound or a "noise" and is removed from the list since it is not considered a "musical" note. Also, for example, in the preferred embodiment, if the average energy e is less than 0.0005, then the note is considered "non-musical" as well and is classified as "noise" or "unintentional sound".

Pitch Assignment Module

Figure 4:
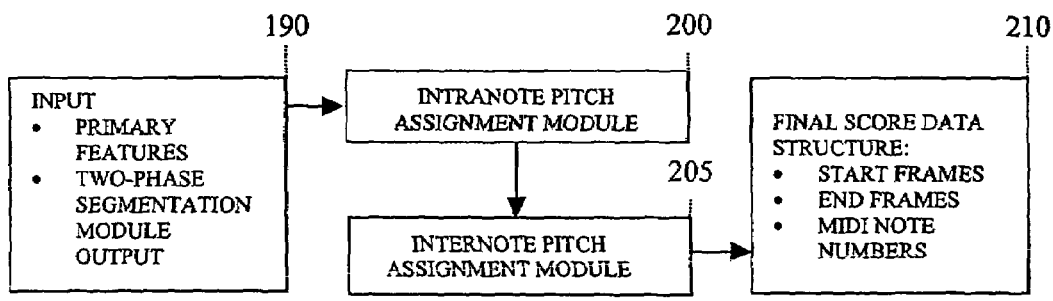
FIG. 4 is a part block diagram, part flow diagram of the operation of the pitch assignment module including the intranote pitch assignment subsystem and the internote pitch assignment subsystem of FIG. 1.

FIG. 4 shows the process of the pitch assignment module including the intranote pitch assignment subsystem 170 and the internote pitch assignment subsystem 180 of FIG. 1. The Pitch Assignment Module accepts as input the output of the Two-Phase Segmentation Module and the Primary Feature Estimation Module, and assigns a single pitch to each note detected by the Two-Phase Segmentation Module, step 190. This output is first sent to the intranote pitch assignment subsystem, step 200. Output from the intranote pitch assignment subsystem, step 205 is sent to the internote pitch assignment system, step 205. The Intranote Pitch Assignment Subsystem 170 and the Internote Pitch Assignment Subsystem 180, determine the assigned pitch for each note in the score. The major difference between these two subsystems is that the Intranote Pitch Assignment Subsystem does not use contextual information (i.e., features corresponding to prior and future notes) to assign MIDI note numbers to notes, whereas the Internote Pitch Assignment Subsystem does make use of contextual information from other notes in the score. The output of the pitch assignment module is a final score data structure, 210. The score data structure includes the starting frame number, the ending frame number, and the assigned pitch for each note in the sequence. The assigned pitch for each note is an integer between 32 and 83 that corresponds to the Musical Instrument Digital Interface (MIDI) note number.

The set of primary features between and including the starting and ending frame numbers are used to determine the assigned pitch for each note as follows. Let $S_j$, denote the set of frame indices between and including the starting and ending frames for note j. The set of fundamental frequency estimates within note j is denoted by $\{f_0[i], \forall i \in S_j\}$.

Figure 5:
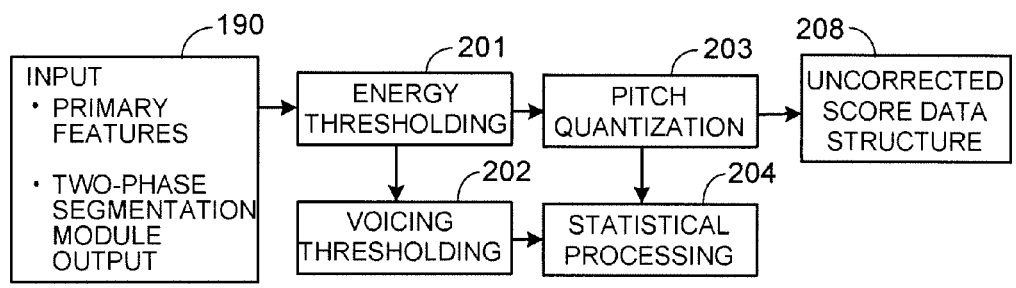
FIG. 5 is a part block diagram, part flow diagram of the operation of the intranote pitch assignment subsystem of FIG. 4.

FIG. 5 shows the operation of the intranote pitch assignment subsystem, 170. The Intranote Pitch Assignment Subsystem consists of four processing stages: the Energy Thresholding Stage 201, the Voicing Thresholding Stage 202, the Statistical Processing Stage 203, and the Pitch Quantization Stage 204. The Energy Thresholding Stage removes from $S_j$ fundamental frequency estimates with corresponding time-domain energies less than a specified energy threshold, which is for example 0.1 and creates a modified frame index set $S_j^E$. The Voicing Thresholding Stage removes from $S_j^E$ fundamental frequency estimates with corresponding voicing probabilities less than a specified voicing probability threshold and creates a modified frame index set $S_j^{EV}$. An example value of the voicing probability threshold is 0.5. The Statistical Processing Stage computes the median and mode of $\{f_0[i], \forall i \in S_j^{EV}\}$ and classifies $\{f_0[i], \forall i \in S_j^{EV}\}$ into one or more distributional types with a corresponding confidence estimate for the classification decision. Distributional types may be determined through clustering as described in K. Fukunaga, Statistical Pattern Recognition, 2nd Ed. Academic Press, 1990, p. 510. In a preferred embodiment, the distributional types are flat, rising, falling, and vibrato, however many more distributional types are possible. Also in a preferred embodiment of the invention, the class decisions are made by choosing the class with the minimum squared error between the class template vector and the fundamental frequency vector with elements $\{f_0[i], \forall i \in S_j^{EV}\}$. The mode is computed in frequency bins corresponding to quarter tones of the chromatic scale. The Pitch Quantization Stage accepts as input the median, mode, distributional type, and class confidence estimate and assigns a MIDI note number to the note. A given fundamental frequency in Hz is converted to a MIDI note number according to the formula $$m = m_A + 12\log_2\left(\frac{f_0}{f_A}\right) \quad (7)$$

where $m_A=69$ and $f_A=440$ Hz. In the preferred embodiment, MIDI note numbers are assigned as follows. For flat distributions with high confidence, the MIDI note number is the nearest MIDI note integer to the mode. For rising and falling distributions, the MIDI note number is the nearest MIDI note integer to the median if the note duration is less than 7 frames and the nearest MIDI note integer to the mode otherwise. For vibrato distributions, the MIDI note number is the nearest MIDI note integer to the mode.

Figure 6:
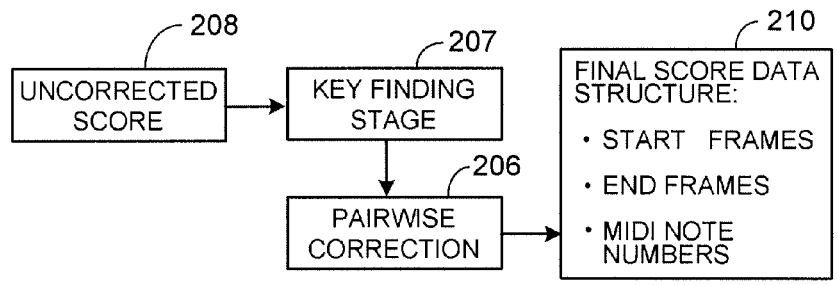
FIG. 6 is a part block diagram, part flow diagram of the operation of the internote pitch assignment subsystem of FIG. 5.

FIG. 6 shows the operation of the internote pitch assignment subsystem 180. The Internote Pitch Assignment Subsystem consists of two processing stages: the Key Finding Stage 207 and the Pairwise Correction Stage 206. The Key Finding Stage assigns the complete note sequence a scale in the ionic or aolian mode, based on the distribution of Tonic, Mediant and Dominant pitch relationships that occur in the sequence. A scale is created for each chromatic pitch class, that is for C, C#, D, D#, E, F, F#, G, G#, A, A# and B. Each pitch class is also assigned a probability weighted according to scale degree. For example, the first, sixth, eighth and tenth scale degrees are given negative weights and the zeroth (the tonic), the second, the fourth, fifth, seventh and ninth are given positive weights. The zeroth, fourth and seventh scale degrees are given additional weight because they form the tonic triad in a major scale.

The note sequence is compared to the scale with the highest probability as a template, and a degree of fit is calculated. In the preferred implementation the measure of fit is calculated by scoring pitch occurrences of Tonic, Mediant and Dominant pitch functions as interpreted by each scale. The scale with the highest number of Tonic, Mediant and Dominant occurrences will have the highest score. The comparison may lead to a change of the MIDI note numbers of notes in the score that produce undesired differences. The differences are calculated in the Pairwise Correction Stage.

In the Pairwise Correction Stage, MIDI note numbers that do not fit the scale template are first examined. A rules-based decision tree is used to evaluate a pair of pitches—the nonconforming pitch and the pitch that precedes it. Such rule-based decision tree based on Species Counterpoint voice-leading rules are well known in the art, and are described, for example, in D. Temperley, "The Cognition of Basic Musical Structure," The MIT Press, Cambridge, Mass., 2001, pp. 173-182. The rules are then used to evaluate the pair of notes consisting of the nonconforming pitch and the pitch that follows it. If both pairs conform to the rules, the nonconforming pitch is left unaltered. If the pairs do not conform to the rules the nonconforming pitch is modified to fit within the assigned scale.

The corrected sequence is again examined to identify pairs that may not conform to the voice-leading rules. Pairs that do not conform are labeled dissonant and may be corrected. They are corrected if adjusting one note in the pair does not cause a dissonance (dissonance is defined by standard Species Counterpoint rules) in an adjacent pair either preceding or following the dissonant pair.

Each pair is then compared to the frequency ratios derived during the Pitch Quantization Stage. If a pair can be adjusted to more accurately reflect the ratio expressed by pairs of frequencies, it is adjusted to more accurately reflect that ratio. In the preferred implementation, the adjustment is performed by raising or lowering a pitch from a pair if it does not cause a dissonance in an adjacent pair.

Computer System Implementation

Figure 7:
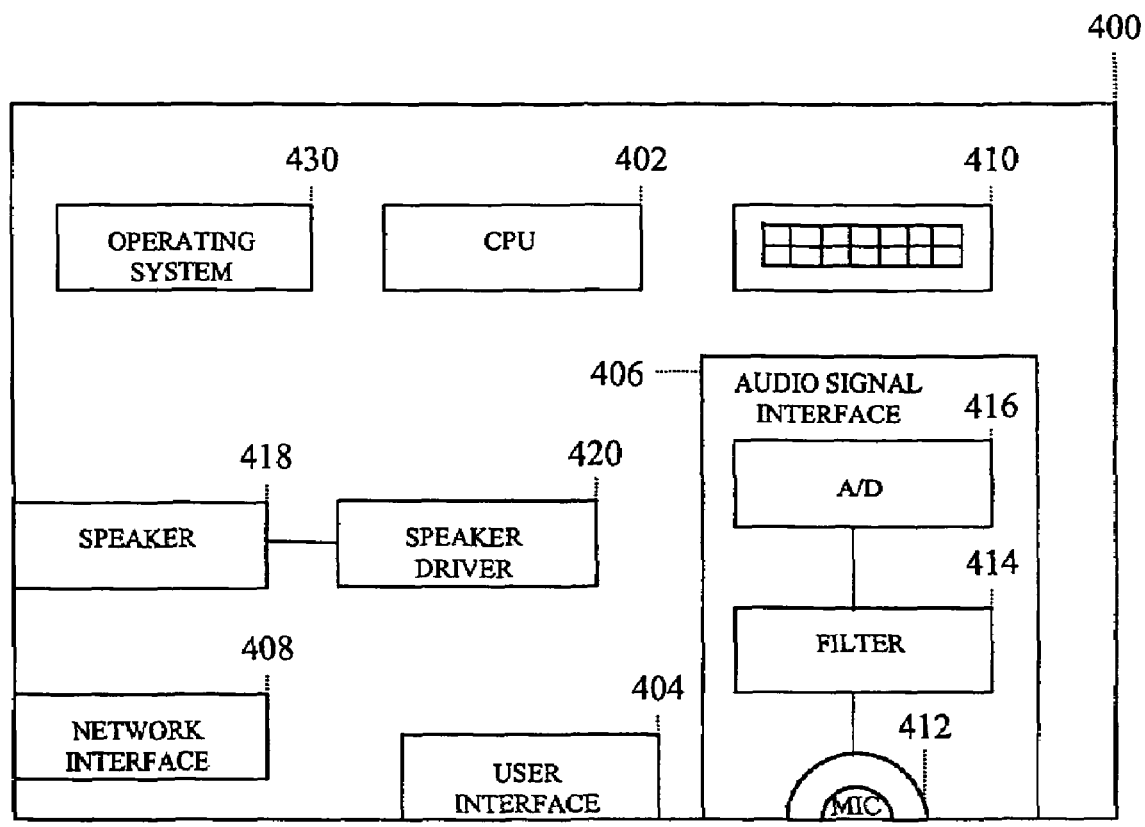
FIG. 7 is a block diagram of a networked computer implementation of the system of FIG. 1.

FIG. 7 depicts a computer system 400 incorporating a recording and note generation, in place of the call handling and SMS handling, respectively, shown in FIG. 1. This is another preferred embodiment of the present invention. The computer system includes a central processing unit (CPU) 402, a user interface 404 (e.g., standard computer interface with a monitor, keyboard and mouse or similar pointing device), an audio signal interface 406, a network interface 408 or similar communications interface for transmitting and receiving signals to and from other computer systems, and memory 410 (which will typically include both volatile random access memory and non-volatile memory such as disk or flash memory).

The audio signal interface 406 includes a microphone 412, low pass filter 414 and analog to digital converter (ADC) 416 for receiving and preprocessing analog input signals. It also includes a speaker driver 420 (which includes a digital to analog signal converter and signal shaping circuitry commonly found in "computer sound boards") and an audio speaker 418.

The memory 410 stores an operating system 430, application programs, and the previously described signal processing modules. The other modules stored in the memory 410 have already been described above and are labeled with the same reference numbers as in the other figures.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the present invention could be embedded in a communication device, or stand-alone game device or the like. Further, the input signal could be a live voice, an acoustic instrument, a prerecorded sound signal, or a synthetic source.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for generating an identification signal, comprising:

accepting as input a voice signal of limited duration;

translating said voice signal to a representation of a series of discrete tones, including generating a digital representation of said voice signal, dividing said digitized signal into a plurality of frames, extracting analysis data from each said frame, formatting said analysis data into a frame representation, and grouping said frames into a plurality of regions;

producing a control signal from said representation of discrete tones, said control signal suitable for causing a transponder to generate a signal, where said generated signal is human-recognizable as a translation of said voice signal;

determining the existence of a candidate note start frame in each said region;

determining a stop frame corresponding to each start frame;

forming an initial set of fundamental frequencies from said start and corresponding stop frames;

removing from said initial set those fundamental frequencies having corresponding time-domain energies less than an energy threshold to form a modified set of fundamental frequencies;

removing from said modified set those fundamental frequencies having corresponding voicing probabilities less than a voicing probability threshold to form a twice modified set of fundamental frequencies;

determining a median for each member of said twice modified set;

determining a mode for each member of said twice modified set;

determining a distributional type for each member of said twice modified set with an associated class confidence estimate; and assigning a MIDI note number to each member of said twice modified set in response to said mode, said median, said distributional type and said class confidence estimate, whereby a note sequence is created.

2. The method of claim 1 wherein accepting as input further comprises receiving said voice signal over a telephone connection.

3. The method of claim 2 wherein said telephone connection is wireless.

4. The method of claim 1 wherein said step of accepting as input further comprises receiving said voice signal over a microphone attached to a computer.

5. The method of claim 1 wherein said translating step further comprises translating said voice signal to a range of tones within the capability of a mobile telephone audio output synthesizer.

6. The method of claim 1 further comprising the step of transmitting said control signal to a tone-producing output device responsive to said control signal.

7. The method of claim 1 further comprising the step of determining which regions of said plurality have a valid note start frame.

8. The method of claim 1, wherein determining a candidate note start frame further comprises the step of determining if the cepstral domain energy of a particular frame is greater than a cepstral domain energy threshold and a frame immediately before said particular frame was below said cepstral domain energy threshold.

9. The method of claim 1, wherein determining a candidate note start frame further comprises the step of determining whether a fundamental frequency range of a particular frame is above a fundamental frequency range threshold and whether an energy range for said particular frame is above an energy range threshold.

10. The method of claim 1, further comprising the step of determining a stop frame corresponding to each start frame.

11. The method of claim 10 further comprising the step of verifying each start and stop frame pair by determining whether
   a) average voicing probability is above a voicing probability threshold,
   b) average short-time energy is above an average short-time energy threshold, and
   c) average fundamental frequency is above an average fundamental frequency threshold.

12. The method of claim 1, further comprising the steps of:
   creating a plurality of scales, one for each chromatic pitch class in said note sequence;
   assigning a probability to each pitch class, said probability weighted according to scale degree of each note;
   comparing each said plurality of scales to said note sequence to find a best fit scale based on occurrences of Tonic, Mediant, and Dominant of a particular scale in comparison to the note sequence; and
   selecting the scale with the highest degree of matching.

13. The method of claim 12 wherein said step of assigning probability further comprises:
   assigning negative probability weights to the first, sixth, eighth, and tenth scale degrees and positive probability weights to the zeroth, second, fourth, fifth, seventh, and ninth scale degree.

14. The method of claim 13 wherein assigning positive probability further comprises the step of assigning additional positive probability weight to the zeroth, fourth, and seventh scale degree.

15. The method of claim 12 wherein said comparing step further comprises:
   ranking said plurality of scales in order of probability; and
   comparing said each plurality of scales with said note sequence in order of probability.

16. The method of claim 12, further comprising the steps of:
   examining a first pitch pair having a first note having a non-conforming pitch and a second note preceding the first;
   if said pitch pair does not conform to voice leading rules, then adjusting said first note unless said adjustment causes dissonance in an adjacent pitch pair.

* * * * *